United States Patent [19]

Kurek

[11] 4,286,859

[45] Sep. 1, 1981

[54] AIR POLLUTION ATTENUATION SYSTEM FOR COPIERS EMPLOYING NOXIOUS GAS IN A DEVELOPING CHAMBER THROUGH WHICH THE COPY PASSES FOR DEVELOPMENT

[75] Inventor: Clarence Kurek, Scottsdale, Ariz.

[73] Assignee: Enervest, Inc., Englewood, Colo.

[21] Appl. No.: 28,055

[22] Filed: Apr. 9, 1979

[51] Int. Cl.[3] ...................... B01D 50/00; B01D 19/00; G03D 7/00

[52] U.S. Cl. .................................. 354/300; 422/168; 55/70; 355/27

[58] Field of Search ........................... 422/168; 55/70; 261/121 R, 30; 154/300; 355/27; 34/131, 140, 155

[56] References Cited

U.S. PATENT DOCUMENTS

| | | | |
|---|---|---|---|
| 3,720,150 | 3/1973 | Hurtig et al. | 354/300 |
| 3,900,862 | 8/1975 | Bennett et al. | 354/300 |
| 4,167,319 | 9/1979 | Feitzinger et al. | 354/300 |

FOREIGN PATENT DOCUMENTS

| | | | |
|---|---|---|---|
| 1365759 | 9/1974 | United Kingdom | 55/70 |
| 1414410 | 11/1975 | United Kingdom | 354/300 |

*Primary Examiner*—S. Leon Bashore
*Assistant Examiner*—Chris Konkol

[57] ABSTRACT

An air pollution attenuation system for copiers employing ammonia gas having a vacuum manifold spanning the copy as it emerges from the developing chamber and connected to a stripping bath preferably reactive with the ammonia as for instance aqueous citric acid where a substantial portion of the residual ammonia is removed, the system also including means for returning and distributing the effluent gas from the bath over the copy downstream from the vacuum manifold.

4 Claims, 12 Drawing Figures

AIR POLLUTION ATTENUATION SYSTEM FOR COPIERS EMPLOYING NOXIOUS GAS IN A DEVELOPING CHAMBER THROUGH WHICH THE COPY PASSES FOR DEVELOPMENT

BACKGROUND OF INVENTION

The present invention relates to desk-top copiers generally and specifically to such copiers employing gaseous ammonia as a developing media and is adaptable to all copiers employing a noxious gas which can be stripped by absorption, adsorption or reaction with another media.

One of the principal disadvantages of copiers employing ammonia is the necessity for complex ventilating systems which discharge the effluent developer gas to the outside of the building in which the copier is being used. Such installations are both costly and unsuited for use as desk-top or portable copiers.

The principal object of the present invention is to provide an efficient yet simple and inexpensive scavenging system for removing substantial amounts of effluent ammonia escaping both from the developing chamber as well as entrained on or clinging to the developed copy, circulating the scavenged gas through a stripping bath and returning it to the surface of the developed copy. The scavenging system above-described is coupled with a primary ammonia developing gas circulating system which circulates ammonia from a source of supply to the developing chamber and from thence back to the source of supply for recirculation.

Such a system is able to draw make-up air from both the primary and secondary circulation systems for use as a working media, entrain ammonia into it in the primary system, and strip enough of the ammonia in the secondary system to permit discharge to room air. Additionally, the scavenging system removes ammonia clinging to the developed copy as well as leading from the developing chamber and passes it through the stripping bath with the working media. For still further efficiency, the effluent from the stripping bath, if reactive with the developer gas, such as citric acid with ammonia, can be returned to and distributed over the developed copy downstream from the vacuum scavenger manifold where the partial pressure of the reactive stripping media further neutralizes the developer gas (ammonia) still clinging to the developed copy.

SUMMARY OF THE INVENTION

An air pollution attenuation system for copiers employing noxious gas in a developing chamber through which the copy passes for development comprising vacuum means for drawing residual noxious gas from the surface of a developed copy and entraining the said gas in a contained stream; means for passing the contained noxious gas bearing stream through sequestration means, for removing substantial amounts of the noxious gas from said stream.

PREFERRED EMBODIMENT OF THE INVENTION

The objects and advantages aforesaid as well as other objects and advantages may be achieved by the air pollution attenuation system for copiers claimed herein, a preferred embodiment of which is illustrated in the drawings in which:

Figure 1:
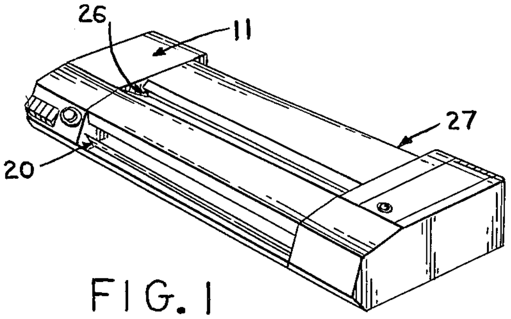
FIG. 1 is a view in perspective of a desk-top copier embodying the system claimed herein.
Figure 2:
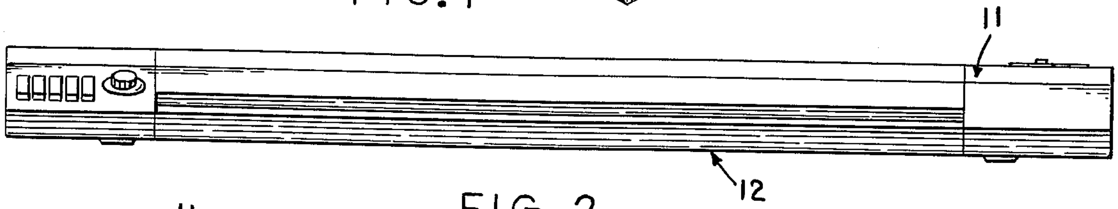
FIG. 2 is a front elevational view of the copier shown in FIG. 1.
Figure 3:
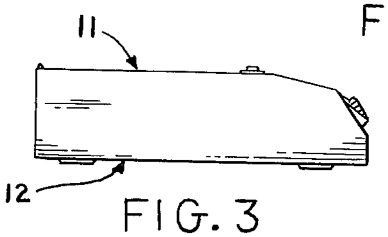
FIG. 3 is a left end elevational view of the copier shown in FIG. 1.
Figure 4:
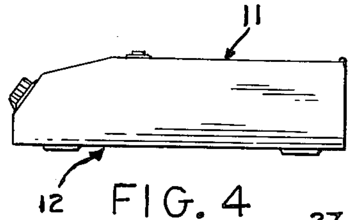
FIG. 4 is a right end elevational view of the copier shown in FIG. 1.
Figure 5:
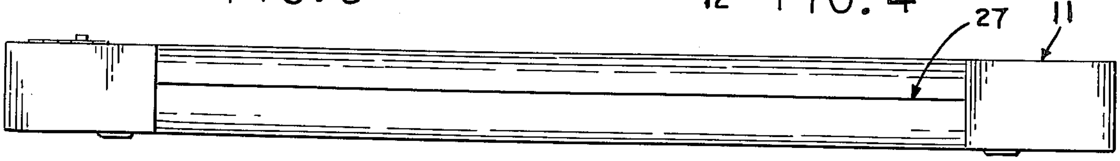
FIG. 5 is a rear elevational view of the copier shown in FIG. 1.
Figure 6:
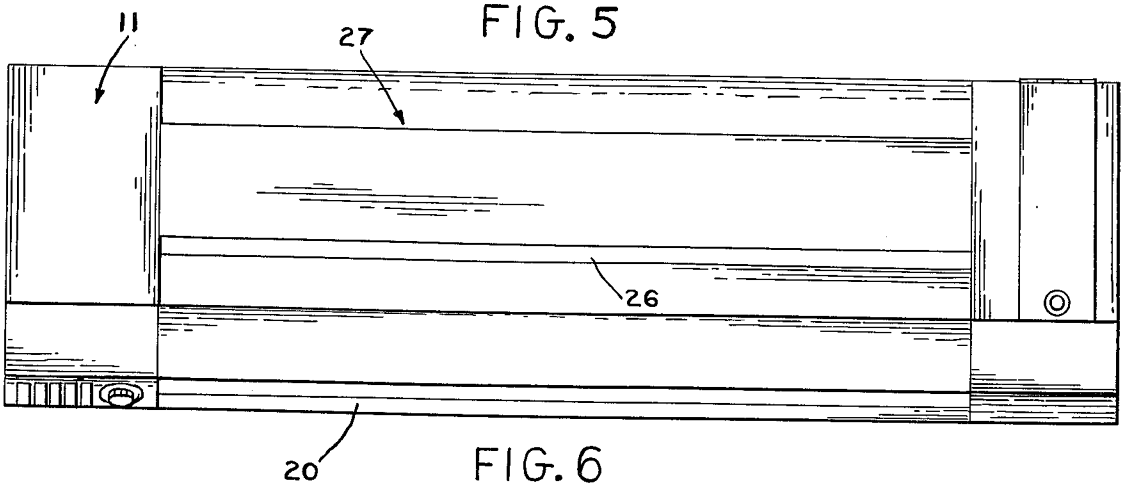
FIG. 6 is a top plan view of the copier shown in FIG. 1.
Figure 7:
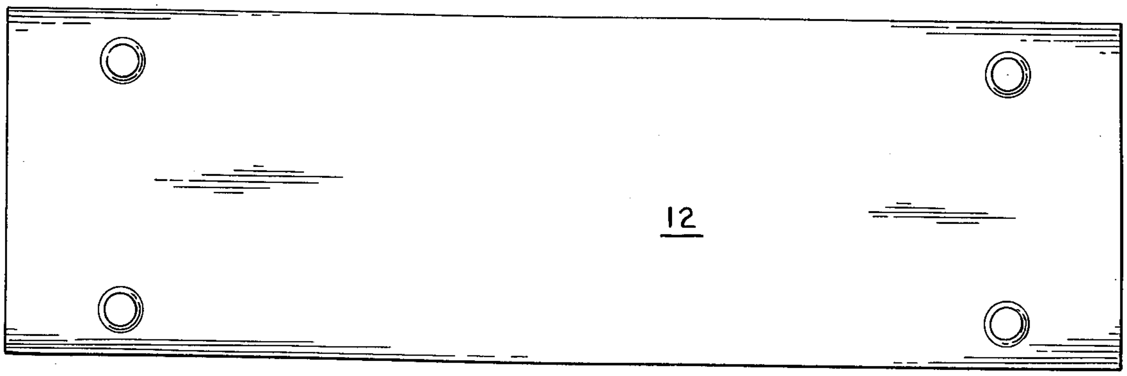
FIG. 7 is a bottom plan view of the copier shown in FIG. 1.
Figure 8:
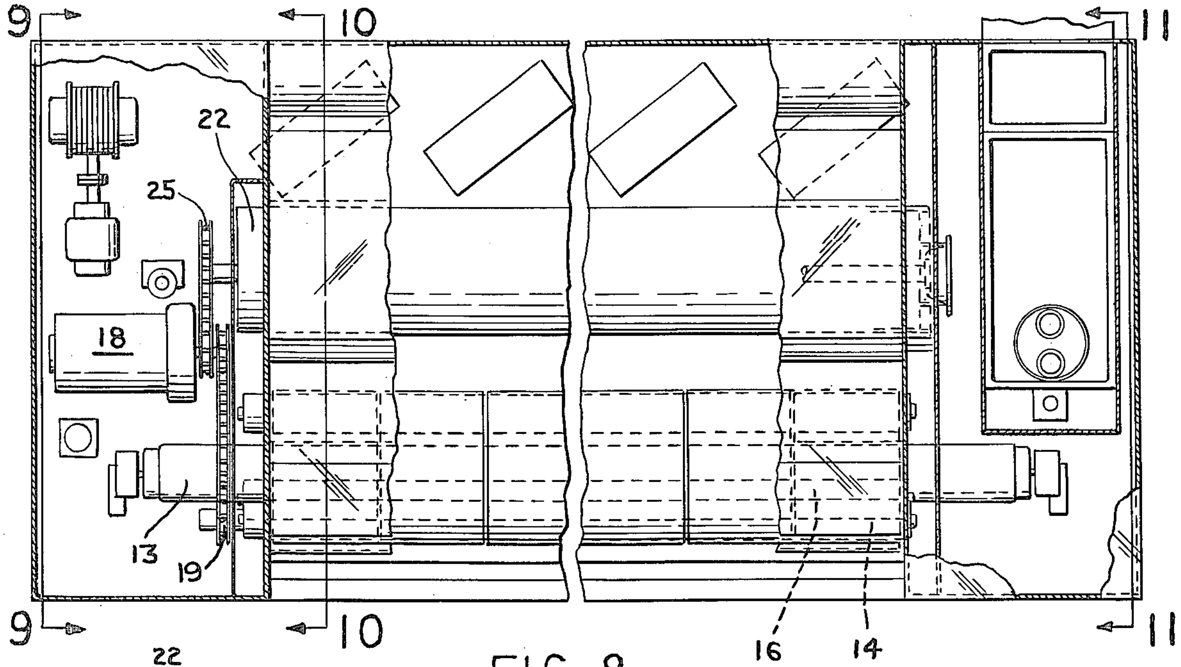
FIG. 8 is a top plan view of the copier shown in FIG. 1 with the top cover broken away.
Figure 9:
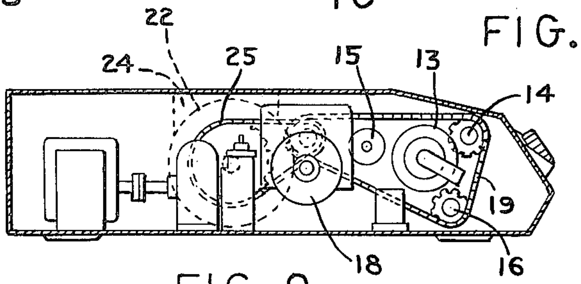
FIG. 9 is an end elevational, cross-sectional view of the copier taken along line 9—9 in FIG. 8 looking in the direction of the arrows.
Figure 10:
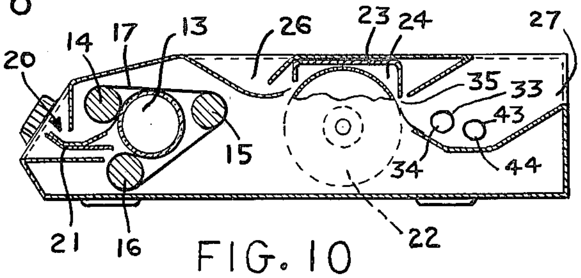
FIG. 10 is an end elevational cross-sectional view of the copier taken along line 10—10 in FIG. 8 looking in the direction of the arrows.
Figure 12:
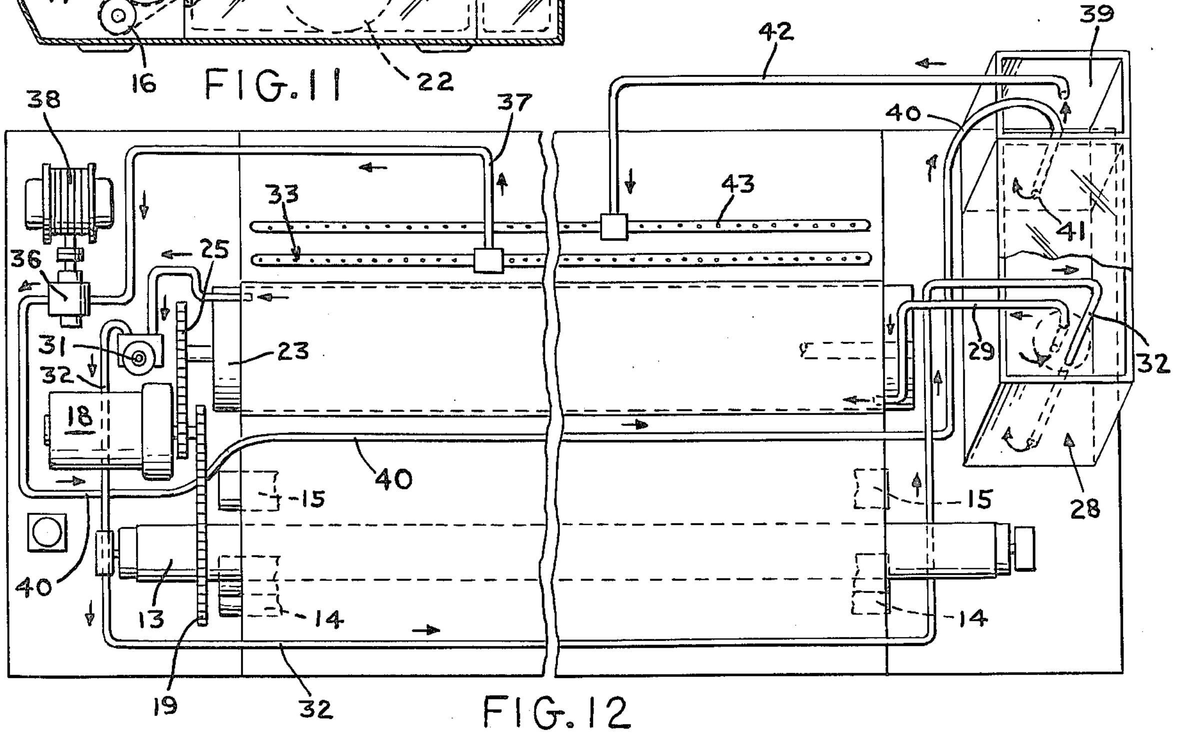

11 is an end elevational, cross-sectional view of the copier taken along line 11—11 in FIG. 8. looking in the direction of the arrows;

FIG. 12 is top plan view of the copier with various parts broken away to expose the gas circulation systems and with the gas supply and stripping bath tanks shown in perspective for clarity.

Referring now to the drawing in detail, the copier comprises an external cover 11 preferably hingedly secured to a base 12, the base 12 and cover 11 providing a hollow housing for the exposure and developing system hereinafter described.

The exposure system is generally old in the art and needs little in the way of detail; consisting generally of an elongated, cylindrical exposure light 13 and belt rollers 14, 15 and 16 around which a continuous carrier belt 17 is wound. A motor 18 drives rollers 14 and 16 through a transmission chain 19. The cover 11 is provided with an opening 20 in the front generally opposite the exposure system above described with a paper guide 21 positioned therein to guide paper into the nip between the exposure light 13 and roller 14 exiting from the nip between the exposure light 13 and roller 16.

The developer system, in and of itself is conventional and needs little by way of detail, consisting generally of a rotating heater drum 22 and a generally inverted, U-shaped closure member 23 in sliding engagement with the top thereof defining a hollow, closed developing gas chamber 24. The drum 22 is driven by motor 18 through transmission chain 25. The cover 11 is provided with a second, generally elongated opening 26 to receive a copy for development and a third such opening 27 in the rear for copy discharge. The copier is provided with two separate but integrated gas circulation systems; the first or primary system for the passage of ammonia developing gas through the development chamber 24 and the second to scavenge residual gaseous ammonia clinging to the copy exiting from the development chamber 24.

Figure 11:
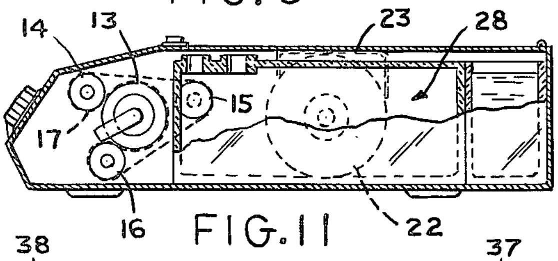

The primary gas system comprises a source of development gas such as ammonia, preferably in a bottle (not shown) of an aqueous solution of ammonia, in a primary tank 28 best shown in FIGS. 11 and 12. Alternately a closed cartridge of aqueous developer gas could be employed with means to pierce the cartridge and simultenously connect conduits thereto.

The developer gas such as ammonia passes from tank 28 through a feed or inlet conduit 29 to the closed side of developing chamber 24. A discharge or outlet conduit 30 connects the opposite side of chamber 24 with the inlet or vacuum side of an electrically driven pump 31. The outlet of pump 31 is connected to the tank 28 through conduit 32 which preferably discharges beneath the surface of the developer gas source if liquid. Because the developing chamber 24 is under negative pressure, there is little danger of significant blow-by at the edges of the closure member 23 and the heater drum 22. Nevertheless, in the case of ammonia as developer gas, significant amounts of ammonia cling to the developed copy discharging from the developer chamber 24 which is sequestered by the second or gas scavenging system hereinafter described.

The gas scavenging system comprises a vacuum manifold 33 having a plurality of openings 34 along its length. The manifold 33 is located proximal to the discharge slot 35 between the closure member 23 and drum 22 with the openings 34 positioned such that the copy passes in close proximity thereto.

The vacuum manifold 33 is connected to the inlet or vacuum side of a second pump 36 through a conduit 37, pump 36 being driven by a motor 38. The discharge or positive pressure side of pump 36 is connected to a stripping tank 39 through a conduit 40.

The discharge end 41 of conduit 40 is preferably located beneath the surface of the stripping media if liquid so that gaseous developer such as ammonia scavenged from the copy is intimately mixed with the stripping media. A suitable stripping media for ammonia is a 5% by weight aqueous solution of citric acid, the effluent gas from which is non-noxious.

The effluent gas from the top of the stripping media tank 39 is passed through conduit 42 to a discharge manifold 43 having a plurality of openings 44 along its length. The discharge manifold 43 is located downstream from the vacuum manifold 33 in the direction of movement of copy. The openings 44 are located so that the copy passes in close proximity thereto.

In operation, both pumps 31 and 36 are energized with the drive motor 18, exposure lamp 13 and heater drum 23. Vacuum generated by pump 31 draws developer gas from tank 28 through the developing chamber 24 from whence the effluent is returned under pressure to tank 28. Simultaneously, air and gaseous developer clinging to the copy is drawn by vacuum through manifold 43 to pump 36 and from thence passed under positive pressure to stripping tank 39 where the developer gas is sequestered. The vacuum manifold 33 also sequesters developer gas escaping from the primary system, if any, before it can escape to the room. However, instead a merely venting the stripped effluent gas from tank 39, it is passed through conduit 42 to a discharge manifold 43 in close proximity to the copy downstream from the vacuum manifold 33. Because there is a partial pressure of stripping media in the effluent gas from the stripping media tank and it is thereafter passed as a gas through discharge manifold openings 44 against the copy, a reaction occurs between the stripping media and residual development gas further decreasing the amount of developer gas escaping from the copier to the room.

It will be understood by those skilled in the art that many modifications and variations of the present invention may be made without departing from the spirit and the scope thereof.

What is claimed is:

1. An air pollution attenuation system for copiers employing a noxious gas in a developing chamber through which a sheet for development passes comprising (a) a developing chamber having an inlet to receive a sheet and an outlet to discharge the sheet;

(b) a vacuum generating manifold external to the developing chamber, lying proximal to the surface of the sheet and positioned proximal to the outlet of the developing chamber extending generally transversely across said sheet and to its direction of movement for drawing residual noxious gas from the surface of said sheet and entraining the said gas in a contained stream;

(c) means for passing the contained, noxious gas bearing stream through stripping means for removing substantial amounts of said noxious gas from said stream the stripping means emitting a gas capable of attenuating the noxious character of the noxious gas; and (d) means for passing the gas emitted from the stripping means to and discharging it in close proximity to the sheet on the opposite side of the vacuum generating manifold from said outlet.

2. An air pollution attenuation system for copiers employing a noxious gas in a developing chamber through which a sheet for development passes in accordance with claim 1 in which, (a) the stripping means includes citric acid.

3. An air pollution attenuation system for copiers employing a noxious gas in a developing chamber through which a sheet for development passes in accordance with claim 1 in which, (a) the vacuum generating manifold is located adjacent to the face of the sheet most heavily exposed to the noxious gas in the developing chamber.

4. An air pollution attenuation system for copiers employing a noxious gas in a developing chamber through which a sheet for development passes in accordance with claim 1 in which, (a) the means for discharging the gas emitted from the stripping means is a manifold, external to the developing chamber lying proximal to the sheet generally parallel to the vacuum generating manifold adjacent to the face of the sheet most heavily exposed to the noxious gas in the developing chamber.

* * * * *